(12) United States Patent
Kim

(10) Patent No.: US 8,001,515 B2
(45) Date of Patent: Aug. 16, 2011

(54) SIMULTANEOUS OPTIMIZATION OF ANALOG DESIGN PARAMETERS USING A COST FUNCTION OF RESPONSES

(75) Inventor: Jang Dae Kim, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 708 days.

(21) Appl. No.: 12/004,862

(22) Filed: Dec. 21, 2007

(65) Prior Publication Data

US 2009/0164953 A1   Jun. 25, 2009

(51) Int. Cl.
*G06F 17/50* (2006.01)
(52) U.S. Cl. .............................. 716/132; 716/106; 703/2
(58) Field of Classification Search ........................ None
See application file for complete search history.

(56) References Cited

U.S. PATENT DOCUMENTS

| | | | | |
|---|---|---|---|---|
| 5,781,430 A * | 7/1998 | Tsai ................................ 700/28 |
| 6,968,517 B2 * | 11/2005 | McConaghy ...................... 716/2 |
| 7,003,742 B2 * | 2/2006 | Saxena et al. ...................... 716/3 |
| 7,047,505 B2 * | 5/2006 | Saxena et al. ...................... 716/2 |
| 7,162,402 B2 * | 1/2007 | Daems et al. ..................... 703/13 |
| 7,328,195 B2 * | 2/2008 | Willis .............................. 706/14 |
| 7,669,150 B2 * | 2/2010 | Li et al. .............................. 716/2 |
| 2005/0257178 A1 * | 11/2005 | Daems et al. ...................... 716/2 |
| 2007/0208548 A1 * | 9/2007 | McConaghy ..................... 703/2 |

* cited by examiner

*Primary Examiner* — Leigh Marie Garbowski
(74) *Attorney, Agent, or Firm* — Dergosits & Noah LLP

(57) ABSTRACT

An analog system consists of a multitude of interconnected components. Design of such a system involves optimization of the component parameters to achieve a target behavior, collectively called specification. The present invention provides a generic cost function for analog design optimization. It also provides cost surface modeling to speed up the optimization. The cost function compares the behavior of a design to a quantitative specification, which can be a 'golden' reference behavior (specification), and measures the error cost, an index of the behavioral discrepancy. That is, the target behavior is explicitly embedded in the cost function. By using the cost function, one can readily qualify a design and thereby identify good/optimum designs. The cost surface modeling with a Latin Hypercube Sampling design-of-experiment provides a statistical mathematical approximation of the actual design's error cost surface, speeding up the optimization by replacing the costly simulation of the actual design with mere evaluation of the mathematical cost surface model expression.

5 Claims, 2 Drawing Sheets

SIMULTANEOUS OPTIMIZATION OF ANALOG DESIGN PARAMETERS USING A COST FUNCTION OF RESPONSES

FIELD OF THE INVENTION

The present invention relates to design optimization techniques for analog systems and, in particular, to simultaneous optimization of the design parameters of an analog system.

DISCUSSION OF THE RELATED ART

An analog system, such as for example an analog semiconductor integrated circuit, consists of a multitude of interconnected components. Design of such a system involves optimization of the component parameters to achieve a target behavior, collectively called a specification. The design parameters, also refereed to in the industry as design variables, may be calculated analytically by hand. For complex systems, however, computer simulation is commonly employed to aid design parameter optimization.

Computer simulation of the system design can predict the behavior of the system for a particular value set of the parameters in the design. The simulation may be iterated by varying the parameter values to search globally optimum parameter values for the design that meet the specification. For a system containing a multitude of design parameters, however, this is very costly; if there are m parameters and each parameter is varied to n different values, then there can be $n^m$ different design iterations.

Latin Hypercube Sampling (LHS) is a known sampling technique for Design-Of-Experiment (DOE). In LHS, the sample size is not very sensitive to the number of parameters in the design. In the case above, it takes only n samples. LHS is often employed in Monte Carlo simulation.

In the simulation of each DOE point, certain behavioral properties of the responses are measured (for example, in a circuit design: 3 dB cut-off frequencies, gain and phase margins, etc.). Response Surface Modeling (RSM) is a known statistical technique for fitting the measured values of a property to a representative mathematical expression, such as a polynomial of the design parameters. After an RSM is successfully obtained, the RSM expression is used for further analyses (e.g., finding the parameter values that result in best performance), thereby replacing the costly simulation of the actual design. LHS is often used for DOE intended for RSM fitting.

Statistical software tools, such as JMP, enable the measured data to be fitted to a response surface model automatically. Then a three dimensional (3-D) visualization of the surfaces is shown for user-selected design parameter pairs.

The RSM method uses the measured values of characteristic behavioral properties directly. It displays what the surfaces of the properties look like. That is, a RSM of a property directly represents the actual design regarding the property. However, the eventual objective on a surface might be specific, such as around a certain fixed target value of the property, or minimization, or maximization. That is, the specification target is not embedded in the RSM explicitly.

SUMMARY OF THE INVENTION

The present invention provides a generic cost function for analog design optimization and cost surface modeling to speed up the design optimization. The cost function compares the behavior of a design to a "golden" reference (or specification) and measures the error cost, an index (i.e., Figure of Merit) of the behavioral discrepancy. That is, the target behavior is explicitly embedded in the cost function. By using the cost function, a design can be readily qualified and thereby good/optimum designs identified.

Corresponding to the RSM, the cost surface modeling with LHS provides a statistical mathematical approximation of the actual design's error cost surface over the design parameters. It enables speeding up the optimization search by replacing the costly simulation of the actual design with mere evaluation of the mathematical cost surface model expression.

The features and advantages of the various aspects of the present invention will be more fully understood and appreciated upon consideration of the following detailed description of the invention and the accompanying drawings, which set forth an illustrative embodiment in which the concepts of the invention are utilized.

DETAILED DESCRIPTION OF THE INVENTION

The behavior of an analog system is typically represented by the system's responses in such domains as time, frequency, etc. The responses are typically waveforms of such quantities as voltage, current, impedance, charge, etc. for electronic systems. Thus, the most obvious comparison of behaviors is direct comparison of their respective response waveforms.

Figure 1:
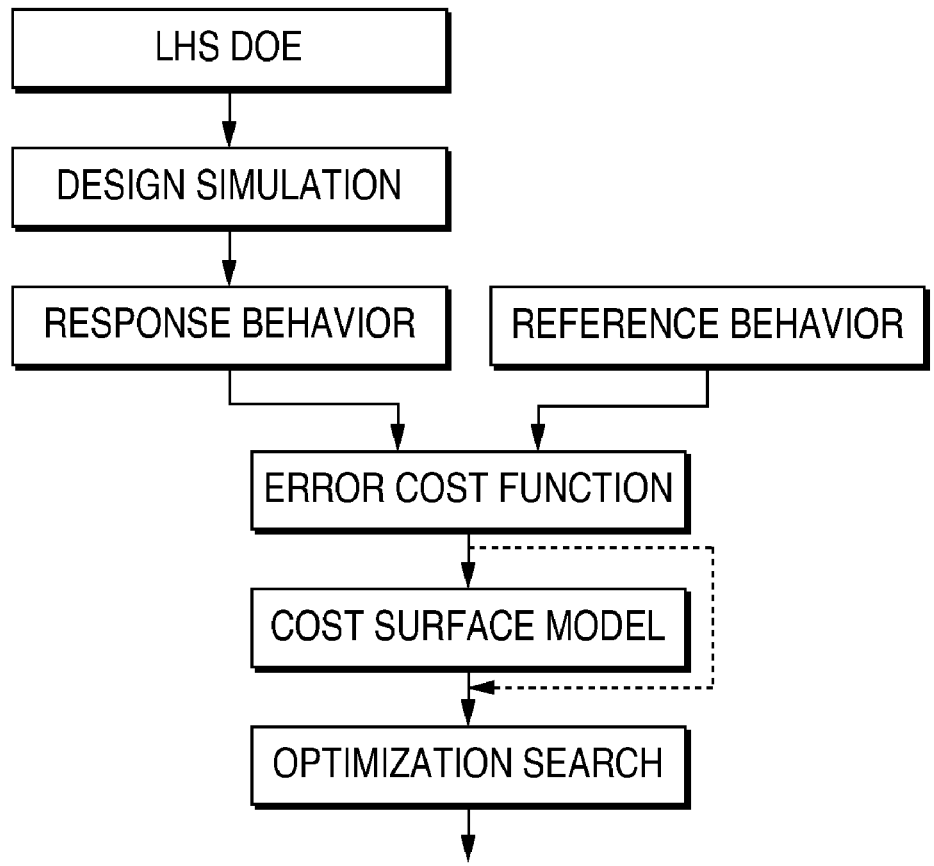
FIG. 1 is a flow chart illustrating the simultaneous analog design parameter optimization techniques in accordance with the concepts of the present invention.

FIG. 1 shows a flow chart, discussed in greater detail below, that illustrates simultaneous analog design parameter optimization techniques in accordance with the concepts of the present invention.

A signal waveform is an array of values over a range in the response domain. The range can be time (in transient response), frequency (in frequency response), or a parameter (in parametric analysis) such as temperature. For a given value set of design parameters, a response signal waveform y1 is obtained over a range from simulation (or experiment) of the design. There is a corresponding "golden" reference behavior waveform y2 over the same range. An error function signal waveform of the two signals is defined as f(|g(y1)−g(y2)|), where f and g are signal functions that transform a signal waveform to another waveform. That is, the function g is first applied to signals y1 and y2, and then the absolute difference signal function is applied to the transformed waveforms g(y1) and g(y2). The function g can be an identity, that is g(y)=y. Finally, yet another signal function f is applied to the absolute difference signal waveform |g(y1)−g(y2)|. The signal function f can be a polynomial of the difference signal |g(y1)−g(y2)|, that is, a0+a1*(|g(y1)−g(y2)|)+a2*(|g(y1)−g(y2)|)$^2$+ . . . where a0, a1, a2, . . . are constants.

A cumulative error function is a cumulative function (e.g., summation, integration, mean average, max, etc.) of the error function signal waveform over an interested interval, or intervals, of the signals' range. The cumulative error function may put some weight over the range or on intervals. A cumulative error function or a combination (possibly weighted) of multiple cumulative error functions is an error cost function that defines the cost surface (and cost surface model). Such an error cost function is referred to herein as a JD's cost function.

Note that a cost function can combine multiple cumulative error functions from different simulations of the design with various testbenches.

A simple error function signal is $|y1-y2|$; $mean(|y1-y2|)$ can be a cost function. For frequency-domain responses, it is common to analyze the responses in logarithmic scale. Thus, we may have an error function signal $|20*\log_{10}(y1)-20*\log_{10}(y2)|$, which is equivalent to $|20*\log_{10}(y1/y2)|$, and a cumulative function of it as a cost function.

The design parameter space can be explored with the cost function to search for the design parameter value sets that minimize the cost function. It is preferred to use Latin Hypercube Sampling for efficient DOE. When sufficient cost function results are available from simulation on the LHS points of design parameters, the measured cost function data can be fitted to an approximate mathematical expression of cost surface model. A successful cost surface model essentially transforms the optimization problem from the costly simulation of the actual design to mere evaluation of the approximate mathematical cost surface model expression.

The success of fitting the cost function data to a cost surface model depends on the choice of the cost function and the type of cost surface model expression. A Taylor series polynomial is common for the surface model. In this case, the cost function of simple error function $|y1-y2|$ or $|20*\log_{10}(y1)-20*\log_{10}(y2)|$ doesn't work well because the actual surfaces are not smooth with non-differentiable point near the optimum solutions. Thus, the first order term $a1*(|g(y1)-g(y2)|)$ is removed from the polynomial signal function f. Such a polynomial (i.e., $a1=0$) is referred to herein as a JD's polynomial and a cost function of the JD's polynomial is referred to herein as a JD's polynomial cost function. In particular, the function f with only the second order term $(|g(y1)-g(y2)|)^2$ is very convenient and useful.

Note that the reference behavior doesn't have to be in the form of a signal waveform or waveforms. Any quantitative target specification can be the reference behavior and can be embedded in the cost function. For example, if the specification of a low-pass filter circuit is f1 Hz at 3 dB cutoff frequency, then the cost function can be $|f1-f2|^2$ where f2 is the measured 3 dB cutoff frequency on the design. Thus, such a cost function is also JD's cost function.

An embodiment of the concepts of the present invention is demonstrated in the following example. The example consists of two simple low-pass filter circuits having solutions that are known analytically. The filter circuits are simple RC and LR circuits as shown in FIGS. 2A and 2B, respectively.

Figure 2A:
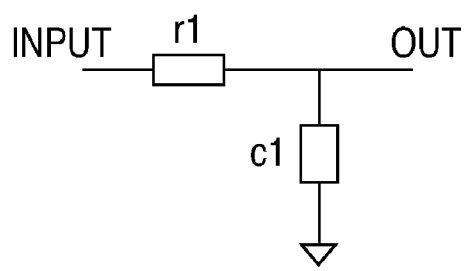
FIG. 2A is a schematic drawing illustrating a simple RC filter circuit.
Figure 2B:
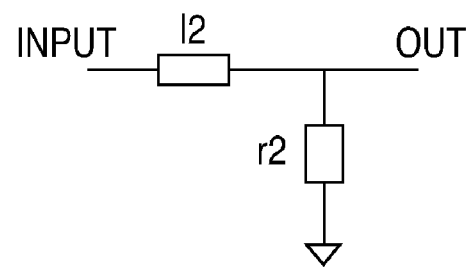
FIG. 2B is a schematic drawing illustrating a simple LR filter circuit.

The FIG. 2A RC circuit consists of a resistor r1 and a capacitor c1. The FIG. 2B LR circuit consists of an inductor l2 and a resistor r2. The transfer function of the FIG. 2A RC circuit is $1/(1+s*c1*r1)$, and the transfer function of the FIG. 2B LR circuit is $1/(1+s*l2/r2)$. Thus, it is analytically known that the input-output behaviors of the two circuits are identical if and only if $c1*r1=l2/r2$. The methods described above show that one can find approximate solutions for two cases.

For the first case, the RC circuit is fixed with r1 and c1 set to 2 KOhm and 5 pF, respectively. A frequency sweep AC analysis (frequency range of 1.1 KHz to 10 GHz) is performed on the RC circuit and the output response is captured as a reference behavior y1. Then, the parameters l2 and r2 of the LR circuit are changed, the same AC analysis is run, and the response y2 is compared to that of the reference y1. The simple squared error function $(|y1-y2|)^2$ is used and the mean average of the error function waveform is taken for the entire span of the simulation frequency range as the error function. A Latin Hypercube Sample of size 71 is used with plus/minus 20% parameter range around an analytic solution at center. Simulation is run on the sample points and the error function results are measured. The results are fed to JMP to obtain a cost surface model.

Figure 3:
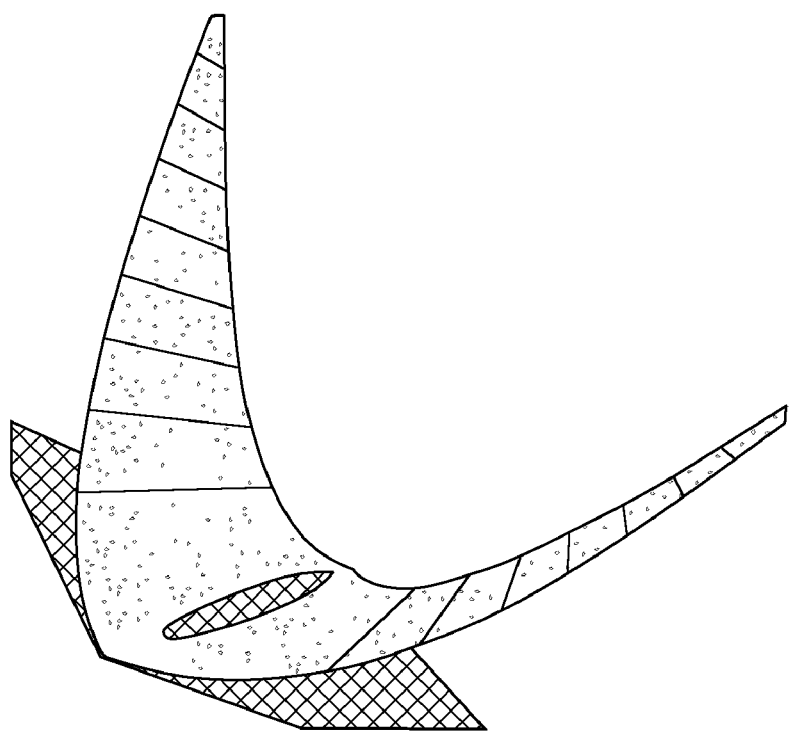
FIG. 3 illustrates the error cost surface for the FIG. 2B LR filter circuit.

FIG. 3 shows the resulting cost surface model along with the measured data points. The black dots are the simulation data points; about half of the data points are on the cost surface and the other half are underneath the cost surface. The mesh plane is the zero-cost plane. The analytical solutions lie on a straight line, $l2/r2=10^{-8}$. The cost surface closely follows the ideal solution line.

The resulting cost surface model expression is $-5.866e-5+l2*0.0430832+r2*1.302e-10+(l2-0.001)*(l2-0.001)*31615.186+(l2-0.001)*(r2-99990.5)*(-0.000627)+(r2-99990.5)*(r2-99990.5)*3.168e-12+(l2-0.001)*(l2-0.001)*(l2-0.001)*(-32912478)+(l2-0.001)*(r2-99990.5)*(l2-0.001)*0.3113792+(r2-99990.5)*(r2-99990.5)*(l2-0.001)*3.1512e-9+(r2-99990.5)*(r2-99990.5)*(r2-99990.5)*(-3.24e-17)$. The cubic model expression indicates the center at $l2=1$ mH and $r2=99.99$ KOhm which is almost perfect.

Figure 4:
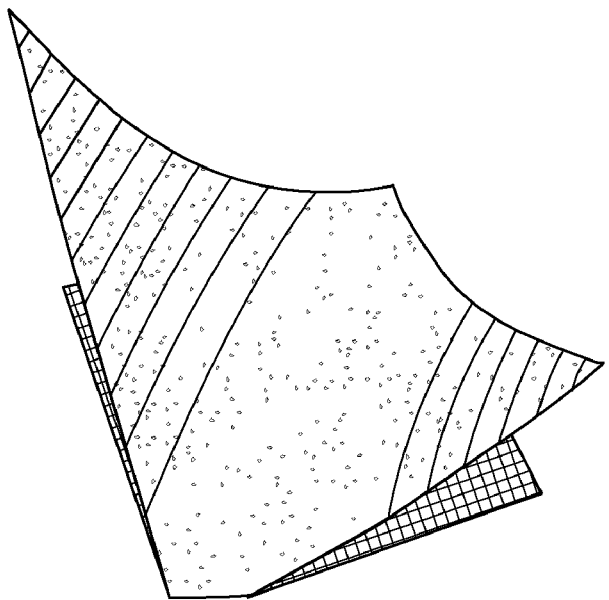
FIG. 4 illustrates the error cost surface for the FIG. 2A RC filter circuit.

For the second case, the LR circuit ($l2=1$ mH, $r2=100$ KOhm) and the RC circuit is adjusted. The analytical solutions for this case lie in a curved line, $r1*c1=10^{-8}$. The results are shown in FIG. 4. As expected, the cost surface clearly follows the ideal solutions curve.

The resulting cost surface model expression is $1.8762e-7+c1*(-1983346)+r1*2.07e-9+(c1-5e-12)*(c1-5e-12)*1.277e+21+(c1-5e-12)*(r1-1999.81)*6257485.3+(r1-1999.81)*(r1-1999.81)*7.9848e-9+(c1-5e-12)*(c1-5e-12)*(c1-5e-12)*(-2.5e+32)+(c1-5e-12)*(r1-1999.81)*(c1-5e-12)*(-5.88e+17)+(r1-1999.81)*(r1-1999.81)*(c1-5e-12)*(-1515.724)+(r1-1999.81)*(r1-1999.81)*(r1-1999.81)*(-4.03e-12)$. The cubic model expression indicates the center at $r1=1.999$ KOhm and $c1=5$ pF which is also almost perfect.

It should be understood that the particular embodiments of the invention described above have been provided by way of example and that other modifications may occur to those skilled in the art without departing from the scope and spirit of the invention as express in the appended claims and their equivalents.

What is claimed is:

1. A simultaneous optimization method for analog design parameters of a system, the method comprising:
    utilizing a computer to define a cost function by embedding a quantitative target specification, including 'golden' reference behavior, in the cost function; and
    optimizing the analog design parameters by employing the cost function utilizing a computer.

2. The method of claim 1, wherein the cost function uses a JD's polynomial.

3. The method of claim 2, wherein the JD's polynomial is $|g(y1)-g(y2)|^2$ where g is a function that transforms target reference behavior y1 and design response behavior y2.

4. The method of claim 1, and further comprising:
    employing a design-of-experiment for simulation of the design by varying values of design parameters;
    fitting measured cost function data from simulation of the design-of-experiment points to an approximate mathematical cost surface model expression for the cost function with respect to the design parameters; and
    optimizing the design parameters by utilizing a resulting cost surface model expression.

5. A method as in claim 4, and wherein the design-of-experiment is a Latin Hypercube Sampling.

\* \* \* \* \*